United States Patent [19]
Bro et al.

[11] 3,990,918
[45] Nov. 9, 1976

[54] ENERGY STORAGE DEVICE WITH MULTI-FUNCTION PROTECTIVE SEAL

[75] Inventors: Per Bro, Andover; Nikola Marincic, Winchester, both of Mass.

[73] Assignee: P. R. Mallory & Co., Inc., Indianapolis, Ind.

[22] Filed: July 7, 1975

[21] Appl. No.: 593,346

Related U.S. Application Data

[63] Continuation of Ser. No. 288,828, Sept. 13, 1972, abandoned.

[52] U.S. Cl. ............................................... 429/185
[51] Int. Cl.² ......................................... H01M 2/08
[58] Field of Search ............ 136/100 R, 6 LN, 107, 136/30, 111, 133; 252/62.2

[56] References Cited
UNITED STATES PATENTS

| | | | |
|---|---|---|---|
| 2,744,217 | 5/1956 | Aikman | 136/133 |
| 2,862,157 | 11/1958 | Haring et al. | 252/62.2 |
| 3,713,896 | 1/1973 | Feldhake | 136/133 |

*Primary Examiner*—Donald L. Walton
*Attorney, Agent, or Firm*—Ronald S. Cornell; Israel Nissenbaum; Charles W. Hoffmann

[57] ABSTRACT

An electric cell with a plastic seal prone to cold-flow from pressure areas, combined with an elastomeric prone to corrosive action from organic electrolyte, so the plastic will protect the elastomeric, while the elastomeric will compensate for the cold-flow.

2 Claims, 1 Drawing Figure

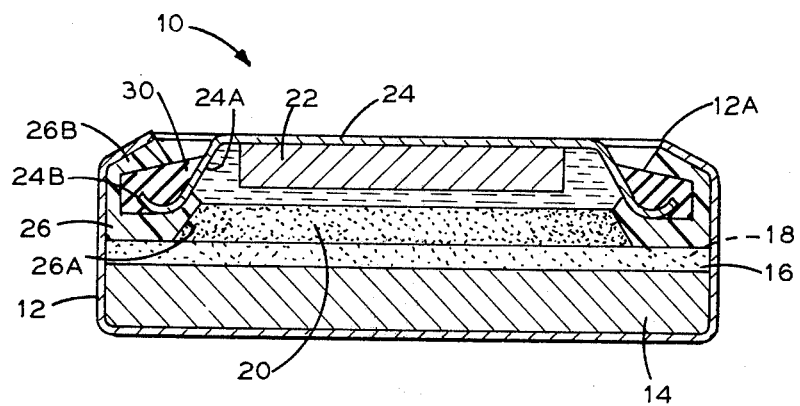

ENERGY STORAGE DEVICE WITH MULTI-FUNCTION PROTECTIVE SEAL

This is a continuation of application Ser. No. 288,828, filed Sept. 13, 1972 now abandoned.

This invention relates to energy storage devices, such as primary electric cells, which employ hermetically sealed containers; and the invention is particularly directed to a sealing element to overcome certain disadvantages in current conventional sealed electric cell structures.

In manufacturing one type of electric cell which utilizes an organic electrolyte, the elements and components of the cell are disposed in a metal can, usually of steel or of electro-plated steel sheet, as one electrode terminal of the cell, generally cylindrical in form, with an initially open end through which the elements and components of the cell may be inserted into position in the can; and the can is then appropriately sealed with a suitable cover element that serves as the other electrode terminal of the cell. The cover is supported at the originally open end of the can on a suitable insulating support, to separate the cover and the can electrically, in view of their respective functions as electrode terminals of the cell. The insulating support for the cover is generally utilized as the sealing element, which is arranged to be disposed in some suitable manner between the cover and the can edge, under pressure, usually by peening the upper edge of the can over onto the insulating sealing element. A suitable element or part of the can structure is usually provided as a seat or bracing element for reaction pressure on the seal.

Plastic materials are generally used for the seal, and they are formed in such manner as to serve as a grommet to be placed and held under pressure between the cover and the can. One of the problems encountered is that plastic materials, while providing adequate insulation, can not alone maintain desired tightness of the seal, because such materials have a tendency to cold-flow away from a high-stress or high-pressure area, thereby relaxing the seal and allowing liquid electrolyte to escape from the interior of the cell. Thus, although the plastic materials are relatively inert and impermeable to organic solvents, such as might be present in the organic electrolytes in the cell, such plastics do not provide a complete and adequate closure for the cell, based merely on their desirable and positive characteristics, such as their insulating qualities and their initial compressibility and initial resilience. The cold-flow is a negative and undesirable characteristic in those materials.

On the other hand, elastomeric materials provide good mechanical seals, and they would generally be adequate to maintain the seal throughout the active life of the cell, if not subjected to chemical reaction. However, the known elastomers are highly permeable to organic solvents such as acetonitrile, propylene carbonate, tetrahydrofuran, and others used in the organic electrolyte cells. The loss of solvents through a rubber grommet occurs in spite of a mechanically tight seal it makes, and the result is the drying out and failure of such cells, with consequent leakage of the electrolyte to outside the cell. The cell becomes unsightly, even though it might still be adequate for normal operation. The leaked electrolyte creates a psychological doubt in the mind of the viewer about the integrity and operativeness of the cell, and such doubt might well cause the cell to be discarded prematurely. Hence, the special importance of a proper seal.

In accordance with the present invention, a composite grommet has been made to serve as a seal that will provide the two functions that are necessary, namely the compressibility and resilience to provide a complete type closure, while at the same time maintaining the inertness to the electrolytes usually used in organic cells. In accordance with this invention the composite grommet for the sealing action is made to comprise a rubber element, for resilience, to cooperate with a polypropylene element for inertness, and they are appropriately combined to provide the individual desirable functions of each, as a mutual function, thus protecting the rubber from the chemical reaction of the organic electrolyte, and providing resilience and inertness in a seal.

The rubber member is molded and bonded to the cell cover, as an annulus around the edge border, and the polypropylene ring is molded separately and disposed to receive the cell top during the cell assembly operation. In the final assembly, the rubber element is kept from being exposed to the interior of the cell, and is thus kept from contact with the organic electrolyte, but it maintains a pressure against the polypropylene ring and the hardware parts behind it, so that any cold-flow of the polypropylene ring under pressure will be compensated by the resilient follow-through of the rubber element to fill any space left by the cold-flow of the plastic.

The construction and arrangement of one preferred form of the invention disposes the elastomeric material as an annular disc within the annular grommet, and the grommet is disposed with respect to the separator in such manner as to keep the electrolyte from engaging the elastomeric material.

The details of construction of a cell embodying this invention, and the arrangement of the elements in the cell are described in the following specification, taken together wih the single FIGURE of the drawing, which is shown as a vertical transverse section of the cell, to exhibit the several elements and components in position in the finished cell as completed.

As shown in the drawing, a cell 10, embodying this invention, is shown as comprising a cylindrical can 12 that serves as a container for receiving and housing all of the elements of the cell, with the can itself serving as a cathode electrode terminal. The can is initially open at the top to its full diameter, in order to permit the elements to be readily inserted. At the bottom of the can is shown a layer of cathode material 14 which is pressed into the can to fill the can across its full diameter. On top of the cathode 14 is a porous disc separator 16 whose function is to receive, absorb and retain, in saturation, a quantity of electrolyte 18 sufficient to more than saturate the separator 16 and to wet the cathode material 14. A spacer 20, shown substantially as a circular disc, serves to press on the separator 16 and also receives the electrolyte 18 to saturation, to exclude any air bubbles from the cell. A button mass of anode material 22 is supported from a sheet steel cover 24 which serves as the anode electrode terminal of the cell. In closing the cell with the cover 24, the cover is to be physically coupled with the can in a way that will insulate the cover 24 from the can 12, and seal the closed cell in order to retain the electrolyte and prevent its leakage from the cell.

The problem is to provide an insulating seal that will serve also to hermetically seal the cell against leakage of the electrolyte. Various plastic materials, such as, for example, polypropylene, provide adequate insulation between the cover and the can, when the can is peened over onto the plastic grommet to close the cell. One disadvantage of that plastic, and, generally, of the other plastics available for this purpose, however, is that the plastic material tends to cold-flow from any region where the plastic is under stress or pressure, as in this case. When the plastic does cold-flow away from the region of pressure, which was actually relied upon to provide the sealing action, the consequent reduction in pressure on the sealing surface of the plastic, where such cold-flow movement has occurred, permits leakage of the electrolyte out of the cell, through this region of reduced pressure on the plastic.

In the present case, this problem has been solved by introducing an elastomeric material which will retain its resilience under continuing pressure, without any movement in the nature of cold-flow that would tend to reduce the pressure at the surfaces of the elastomeric material where the sealing action is desired.

The usual disadvantage in the use of an elastomeric material, however, is that such materials are chemically reactive with the usual electrolytes that are used in such a cell.

In order to provide a sealing grommet in accordance with this invention, two materials are combined, namely, a plastic, polypropylene, and an elastomeric material, but, in such manner, that the plastic protects the elastomeric material from the electrolyte, and the elastomeric material adjusts itself to compensate for any cold-flow movement of the plastic. In its relationship to the plastic, the elastomeric element is positioned in such manner that none of it will extend into the interior of the cell where it might come in contact with the electrolyte. Thus, as shown in the drawing, the plastic grommet 26 is substantially of C-shaped cross section and is first positioned in the cell to seat as an annular ring on the top surface of the separator 16, and around the spacer 20, with sufficient electrolyte in that central space in the cell to assure that all air bubbles are out of the assembly below the spacer 20.

The cover 24 is provided with a peripheral flange 24A and a peripheral rim, as a circular knob 24B, which guide the cover 24 into proper sealing position as the flange and knob 24A and 24B, respectively, with elastomeric ring element 30 are seated in the open cavity of the C-shaped grommet 26 which rests and seats against the lower seating portion 26A of the grommet.

The cover 24 has an elastomeric ring 30 molded thereon which is held anchored by its molding bond to the steel metal of the top 24, and is held in place on the knob 24B. After the top 24 is placed in position with its rim seated inside the lower portion 26A of the plastic grommet, the cell container is held in an evacuated atmosphere to aid in removing any air from the cell. To close and seal the cell, the upper rim edge of the can 12A is then peened over to press down tightly on the top arc portion 26B of the C-shaped grommet. As the upper edge of the can 12A is pressed down tightly, the upper arc 26B of the plastic grommet presses down onto the elastomeric ring 30, against the lower arc portion 26A of the grommet.

The rim edge 12A of the can, after peening, remains relatively immobile and fixed, pressing in on the plastic grommet. The pressure on the plastic portion 26B causes a certain amount of cold-flow in that portion 26B, so it tends to move away from the pressure area under the peened-over edge of the can. Any such cold-flow movement will create increased pressure on the elastomeric ring 30, and develop increased counter pressure by the elastomeric ring which will reduce such tendency of movement of the plastic material and will increase the pressure against that plastic material to maintain the seal.

By placing the elastomeric ring 30 above the flange 24A and knob 24B of the cover 24, the elastomeric material is kept out of the interior of the cell, where it might otherwise be engaged by the organic electrolyte and corroded thereby, which would be harmful to the elastomeric ring and would destroy its effectiveness as part of the grommet seal.

By means of such a joint construction in the seal, the inert function of the seal with respect to the electrolyte is retained, by the plastic grommet, and any cold-flow movement is compensated for by the continuous resilience of the elastomeric ring. Thus, the overall function of the grommet provides the desired resilience of the grommet as a seal, together with the inertness with respect to the electrolyte. Cells provided with the double function and structure of the disclosed grommet have shown a remarkable reduction in the drying out of the electrolyte.

The construction of the grommet and its arrangement may be varied, within the spirit and scope of the invention, in cells of the indicated construction or in other cells or energy containers, without departing from the spirit and scope of the invention as defined in the claims.

What is claimed is:

1. A sealed electric cell comprising a cylindrical container with an open end, anode and cathode elements in the container, the anode and cathode elements separated from each other, an organic electrolyte in the container, a cover comprising a disc with a peripheral flange in the open end of the container, sealing means between the container and the cover to seal the container, the sealing means including an elastomeric element molded on the flange of said cover and said elastomeric element being prone to attack by the organic electrolyte in the container which attack harmfully affects the sealing characteristic of the elastomeric element, and a compressible plastic element outwardly adjacent to the elastomeric element and fitted against the side wall of the container at about the open end of the container, the plastic of the plastic element being prone to cold-flow movement when subjected to pressure, which flow harmfully affects the sealing characteristic of the plastic element, the plastic element having formed therein a cavity to seat and substantially enfold the elastomeric element thereby isolating said elastomeric element from the organic electrolyte contained within the container and from the inner wall of said container, the portion of the container adjacent the open end thereof causing pressure to be exerted against the plastic element and the elastomeric element resulting in cold-flow movement by the plastic of the plastic element and outwardly directed pressure by the elastomeric element counter to the cold-flow movement of plastic in the plastic element to maintain said compressible plastic element in its position fitted against the side wall of the container to thereby prevent electrolyte flow between said compressible plastic element and said wall.

2. The sealed electric cell of claim 1 including a separator-spacer between the anode and cathode elements and adjacent the plastic element, the plastic element compressed between the separator-spacer and the portion of the container adjacent the open end thereof resulting in cold-flow movement by plastic of the plastic element and by outwardly directed pressure of the elastomeric element counter to substantially all cold-flow movement of plastic in the plastic element to seal the electric cell.

* * * * *